United States Patent [19]
du Quesne

[11] Patent Number: 5,325,903
[45] Date of Patent: Jul. 5, 1994

[54] DEVICE FOR THE ADJUSTMENT OF THE TOOL OF AN APPARATUS FOR FITTING AND REMOVING AUTOMOBILE TIRES

[76] Inventor: Francis du Quesne, Kleistraat 138, 2630 Aartselaar, Belgium

[21] Appl. No.: 67,881

[22] Filed: May 27, 1993

[30] Foreign Application Priority Data

May 27, 1992 [BE] Belgium .............................. 09200497

[51] Int. Cl.⁵ .............................................. B60C 25/06
[52] U.S. Cl. .................................................. 157/1.24
[58] Field of Search ..................... 157/1.17, 1.22, 1.24, 157/1.28

[56] References Cited

U.S. PATENT DOCUMENTS 4,210,190 7/1980 Hessels ................................ 157/1.24
4,230,170 10/1980 Duquesne ........................... 157/1.24
4,529,024 7/1985 Vijay .................................... 157/1.24

Primary Examiner—James G. Smith
Attorney, Agent, or Firm—William A. Drucker

[57] ABSTRACT

An eccentric forms part of a cylinder on which a control lever is mounted so that it can rotate in the housing forming part of the arm, where a second eccentric also forms part of the cylinder acting in conjunction with a pressure stud working together with a clamping plate located freely around a guided stop rod along the length of the pivoting arm in the housing and in a guide forming part of the arm, where one extremity of the stop rod works in conjunction with a bearing block forming part of the vertical column, and where a pressure spring is located between the stop rod and the pressure plate, the whole being intended to displace slightly and simultaneously fix the tool at a distance from the wheel, both in the vertical plane and in the horizontal plane.

3 Claims, 3 Drawing Sheets

DEVICE FOR THE ADJUSTMENT OF THE TOOL OF AN APPARATUS FOR FITTING AND REMOVING AUTOMOBILE TIRES

The invention is for a device for adjusting in the horizontal and vertical plane the distance between a wheel fixed on a rotating table and the tool of an apparatus for fitting or removing a car tire respectively to or from said wheel.

Apparatus for fitting and removing car tires is known, which apparatus consists primarily of a base, of a vertical column mounted on the base, of an arm which pivots in the horizontal plane with respect to the column, on the end of which arm there is a rod which can be moved vertically, of a tool for the fitting and removal of the tyre and which is installed at the bottom of said rod, of a rotating table provided with hooks for fastening the wheel on the table and arranged below said tool, of a clamping plate freely located around the vertical rod, of a pressure stud pushed by an eccentric with a control lever in order to press the clamping plate into an oblique position on the vertical rod, to raise it slightly and to fix this and the tool with respect to the wheel, of an eccentric at the other end of the arm which serves to cause the arm to pivot lightly and to fix the arm in a horizontal position with respect to the wheel, and a linkage fitted between the two eccentrics in such a way that a single motion of the control lever causes the vertical and horizontal displacement of the tool with respect to the wheel.

Although it is possible to adjust the tool with respect to the tool by means of a single lever, such apparatus suffers from the disadvantage that not only is its construction complicated, which increases the price, but that moreover such apparatus can become maladjusted and damaged when such apparatus is used without close attention. A further disadvantage resides in the fact that the installation of different parts on such apparatus takes a relatively long time.

With a view to remedying these inconveniences, a device according to the invention has been realized such as described in the claims. This device is simple, costs little, and comprises only a few parts.

By way of example, and without in any way being exhaustive, a more detailed description is given below of a selected embodiment of the device in accordance with the invention. This description refers to the attached drawings in which.

Figure 1:
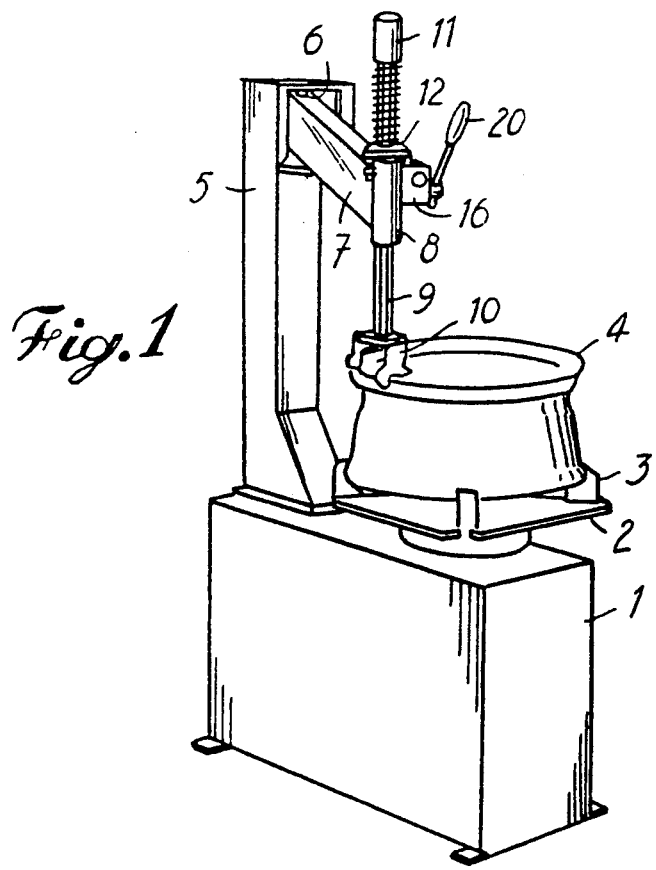
FIG. 1 is a perspective view of an apparatus for fitting and removing automobile tires on which is mounted the device in accordance with the invention.
Figure 2:
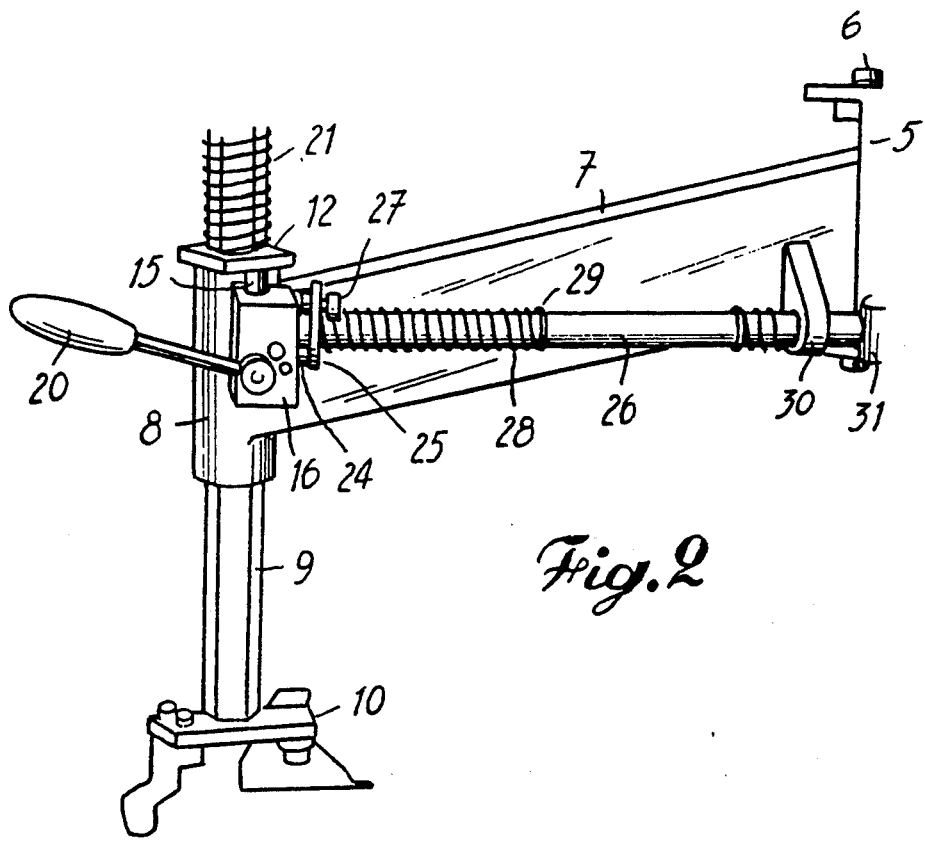
FIG. 2 is a perspective view of the device in accordance with the invention.
Figure 3:
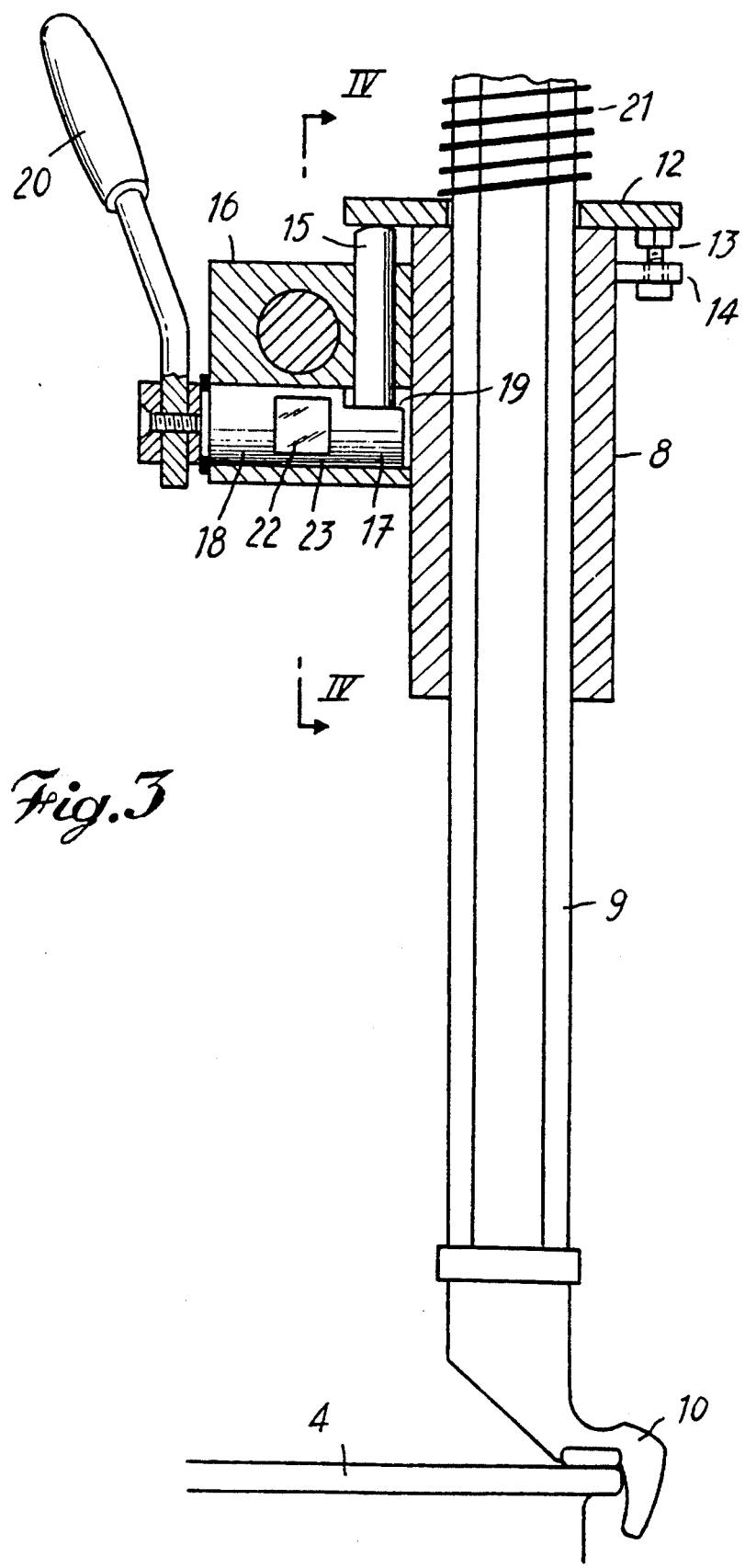
FIG. 3 is a side view showing a section through the device in accordance with the invention.
Figure 4:
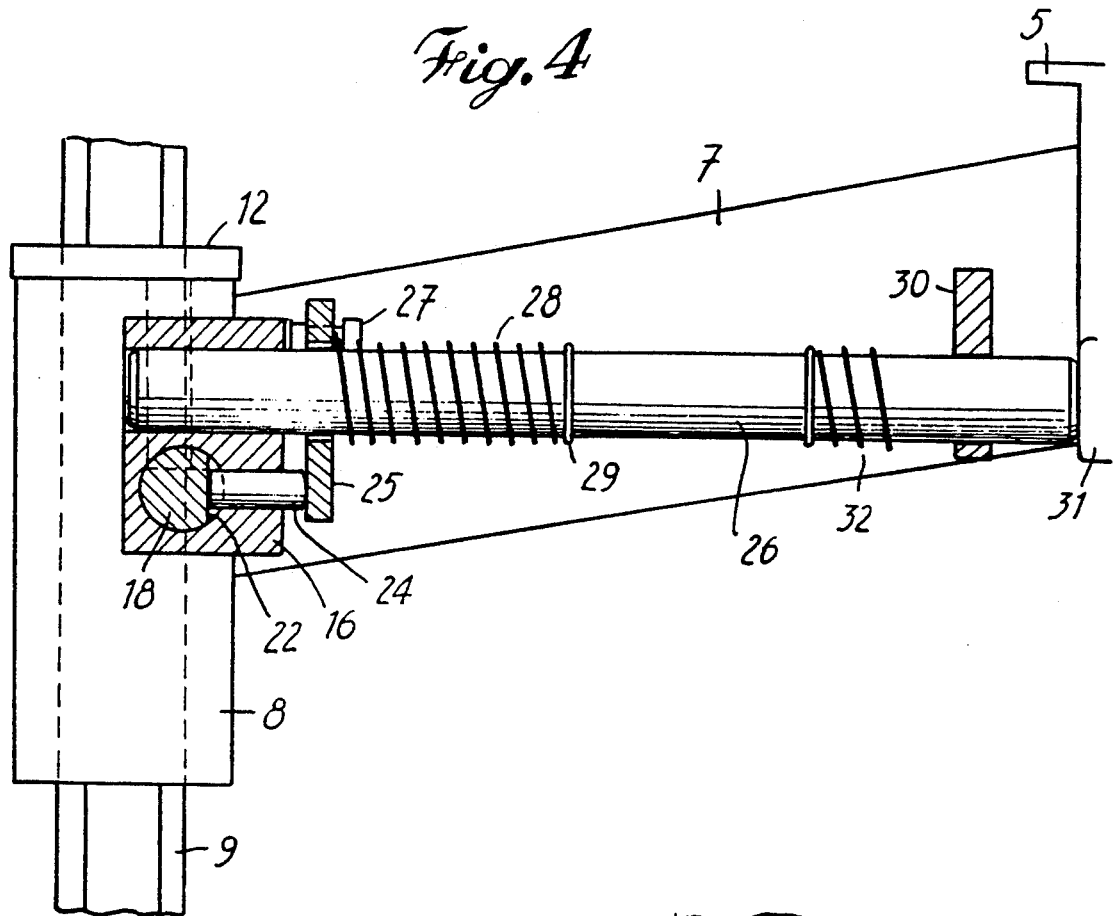
FIG. 4 shows a longitudinal section along the line IV—IV in FIG. 3.
Figure 5:
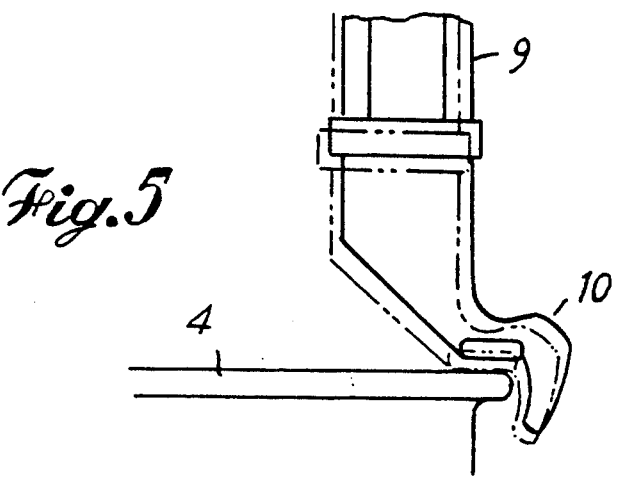
FIG. 5 is a view of the tool when displaced a small distance from the wheel by means of the device in accordance with the invention.

In these figures it can be seen that in front of the base 1 of the apparatus a rotating table 2 driven by a motor is installed in the horizontal plane, which table is provided with radially movable hooks 3, between which the wheel 4 is located. At the back of the base 1 a vertical column 5 is mounted which is provided with a axis around which an arm 7 can pivot, in a horizontal plane.

The front part of the arm is provided with sleeve 8, in which a vertical rod 9 freely slides, the lower end of which bears the tool 10 for the fitting or removal of a tire. The top end of the rod 9 is provided with a grip 11. In order to clamp the rod 9 in the sleeve 8 use is made of a clamping plate 12 located around rod 9, which clamping plate 12 is provided with a guide bolt 13, which can move freely in an eyelet 14 which forms part of the sleeve 8. The clamping plate 12 is pushed obliquely into the clamping position on the vertical rod 9 by a moving pressure stud 15 in a housing 16 attached to the sleeve 8 and pushed upwards by an eccentric 17 formed by a cylinder 18 provided with a flat 19 and mounted so that it can rotate in housing 16. A control lever 20 is fixed on this cylinder 18. A pressure spring 21 placed between the clamping plate 12 and the grip 11, counterbalances the weight of the rod 9 and tool 10 and pushes the clamping plate against the pressure stud 15. The cylinder 18 is provided with a second flat 22 set at 90° with respect to flat 19 and forming with cylinder 18 a second eccentric 23. This eccentric acts in conjunction with a second movable pressure stud 24 in housing 16. The free end of this pressure stud 24 presses against the clamping plate 25 freely disposed around a stop rod 26. The upper end of the clamping plate 25 can slide freely on two guide bolts 27 fixed in housing 16, and can take up an oblique position with respect to the stop rod 26. A pressure spring 28 is located around the stop rod 26, between the clamping plate 25 and a ring 29 fastened on the stop rod 26, in order to push the clamping plate against the pressure stud 24. One end of the stop rod 26 can slide freely in the housing 16 and the back of the stop rod is guided in a guide 30 fastened on the pivoting arm 7. The other end of the stop rod bears on a bearing block 31 forming part of the vertical column 5. A spring 32 is located around the stop rod 26 and the guide 30, in order to absorb any shocks and limit the travel of the stop rod.

In these figures, it can be seen that control lever 20 is inclined towards the front and that in this position the cylinder 18 with the double eccentric 17-23 maintains the pressure studs 15-24 in a withdrawn position such that they do no exert any pressure on the clamping plates 12-25 and that both the vertical rod 9 bearing the tool 11, and the stop rod 26, can be freely moved. When a wheel 4 of a given diameter is fixed between the hooks 3 of table 2, the pivoting arm 7 is drawn towards the wheel by means of a grip 11 and the rod 9 is moved vertically until the tool 10 is in the desired position in contact with the wheel. The control lever 20 is then tilted to the rear, such that the cylinder 18 with the double eccentric 17-23 at the same time pushes the pressure studs 15-24 in a projecting position and that these studs push the clamping plates 12-25 obliquely on rods 9 and 26, which results in the slight rise of the vertical rod 9 and the tool 10 with respect to the wheel 4. As the stop rod 26 bears against the bearing block 31 of column 5, the clamping plate 25 simultaneously moves the housing 16 on the stop rod 26, such that the arm 7 pivots very slightly around shaft 6 and that the tool 10 is also slightly displaced from the wheel 4 in the horizontal plane.

To remove the wheel and to replace it with a wheel of the same dimensions as the first on the rotating table 2, it suffices to use grip 11 to pivot arm 7 and tool 10 in such a way that the tool is moved away from the wheel. When arm 7 with tool 10 is again pivoted towards wheel 4, tool 10 will automatically return to the preselected distance from the wheel.

It goes without saying that the parts described above can be of any kind of shape and dimensions whatsoever and that some of these parts can be replaced with others serving the same purpose. The position of these pieces relative to one another can also differ.

I claim:

1. Device for adjusting in the horizontal and vertical plane the distance between a wheel fixed on a rotating table and the tool of an apparatus for fitting or removing an automobile tire, which apparatus comprises a base, a vertical column mounted on the base, an arm being pivotable in a horizontal plane with respect to said column, a rod being movable vertically at free end of said arm, a tool for the fitting and removal of the tire and installed at the bottom of said rod, a rotating table provided with hooks for fastening the wheel on the table and arranged below said tool, a clamping plate freely located around said rod, a pressure stud to press said clamping plate into an oblique position on the vertical rod to raise it slightly and to fix this and the tool with respect to the wheel, an eccentric actuating said pressure stud, a second eccentric acting in conjunction with a pressure stud, a clamping plate acting in conjunction with said pressure stud, said clamping plate being movable into an oblique position around a stop rod in order to pivot lightly and to fix said arm in a horizontal position with respect to the wheel, said stop rod being guided along the length of said arm in a housing and in a guide forming part of said arm, both eccentrics forming part of a cylinder with control lever in order to rotate said cylinder in said housing, one extremity of said stop rod works in conjunction with a bearing block forming part of said vertical column, a pressure spring located between said stop rod and the last mentioned clamping plate, the whole being intended to displace slightly and simultaneously fix the tool at a distance from the wheel, both in the vertical plane and in the horizontal plane.

2. Device as defined in claim 1, in which the cylinder is provided with two flats set at 90° one to the other and with which the cylinder forms the two eccentrics.

3. Device as defined in claim 1, in which the clamping plate located around the stop rod is freely suspended on two guide bolts fastened in the housing, on which plate the stop rod exercises pressure for blocking the stop rod in the housing.

* * * * *